Patented May 7, 1946

2,400,025

UNITED STATES PATENT OFFICE 2,400,025

TREATMENT OF CATALYST

Walter G. Scharmann, Westfield, N. J., assignor to Standard Oil Development Company, a corporation of Delaware No Drawing. Application May 9, 1942,
Serial No. 442,305

6 Claims. (Cl. 252—237)

This invention relates to the treatment of catalysts, and is more particularly concerned with a method for restoring the compression strength of certain types of catalysts after said strength has been weakened by prolonged exposure of the catalysts to air.

The method of the invention is applicable to certain catalysts which are used in processes of catalytic reforming and catalytic reforming in the presence of hydrogen. These catalysts comprise a major proportion of aluminum oxide and a minor proportion of an oxide or sulfide of a metal of the VI group of the periodic system and are characterized by the fact that they are regenerable, i. e., their activity in promoting reforming, when partially reduced by the deposition thereon of carbonaceous contaminants, may be substantially restored by burning off said carbonaceous contaminants.

Particularly effective catalysts of this type comprise alumina and from 1 to 20% by weight of the oxides of molybdenum or chromium. The catalysts may be prepared in a number of different ways, for example, by co-precipitation of the hydroxides of the ingredients followed by drying and heating; by impregnating the alumina with a solution of a compound of the active metal followed by drying and heating to a high temperature; or by mechanical mixing of the various ingredients. A catalyst containing molybdenum oxide may be prepared in the following manner: a solution of ammonium molybdate is first prepared by adding molybdenum oxide to ammonia water. The molybdenum oxide should be added slowly so that the temperature does not rise above about 140° F. After preparation, the solution of ammonium molybdate is cooled to about 80° F. Aluminum oxide, either a crystalline hydrate, Activated Alumina or any other suitable kind, is then placed in a mixer and to this is added the already prepared ammonium molybdate solution in quantities sufficient to provide the amount of molybdenum oxide which is to be present in the finished catalyst. The mixture is stirred for about 15 minutes and then the paste is molded into small lumps of any suitable size and shape. Small quantities of various types of clays, such as ball clay, may be added to the paste at this point to increase the strength of the final catalyst. The paste may be formed into pills or tablets in a pilling machine or it may be extruded into strings or ribbons in an extrusion means and then cut up into short lengths. Following the molding of the paste, the lumps are dried with steam. The dried lumps are then subjected to an activating treatment which consists in maintaining them in a furnace at a temperature of about 1200° F. until the volatile content as determined at a temperature of about 1600° F. has been reduced to between 1 and 15% by weight. This may require a period of ½ to 2 hours or more. The activated material is then ready for use or may be stored until it is needed. It is found that catalysts having a low volatile content have the best initial activity but must be handled very carefully to avoid physical disintegration of the lumps. On the other hand, it is found that catalysts having a high volatile content are quite rugged and may be handled without much loss from disintegration but their initial activity is lower. In determining the optimum content of volatile matter in the catalyst, it is therefore necessary to strike a balance between the initial activity and physical strength of the catalyst.

The physical strength of the catalysts may be measured in terms of compression strength, that is, the amount of force which may be applied to a lump of the catalyst before it crumbles. In determining this strength, a pill, tablet, or short cylindrical lump of the catalyst is placed on its side and force is applied until the lump crumbles. The crumbling force is determined for half a dozen or more lumps and the average force which causes crumbling of the lumps is taken as the compression strength.

It will be understood that when lumps of the catalyst are packed into reaction vessels which are frequently of great height in relation to diameter, it is essential that these lumps have considerable compression strength to avoid crumbling and disintegration to powder. Powdering of the catalyst not only causes caking and packing in the reaction vessel itself, but also may result in plugging of the lines leading from the vessel.

It has been observed that catalysts of the type above described, when exposed to air for prolonged periods as when kept in storage, lose a considerable amount of their compression strength and hence are not adapted for packing into reaction vessels because substantial powdering and crumbling would occur. This is a serious matter when large quantities of catalysts are involved, as in a commercial plant, because remolding and activation of the catalyst might be necessary in order to restore the compression strength.

I have now found that the compression strength of these catalysts may be restored by reheating the catalyst to temperatures of 500° F. to 1200° F., preferably 700° F. to 1000° F., for periods of about an hour or so. In some cases, if the catalyst, after drying but before activation, is sufficiently rugged to withstand packing in a reactor without crumbling, it may be stored in a dry, unactivated condition, and then when it is to be used, may be packed into the reaction vessel and heated to a temperature of 700° F. to 1000° F. by passage through the reaction vessel of hot gases, such as air, nitrogen, flue gases and the like. In any event, I have found that the compression strength may be restored to its original value or raised to an even higher value by reheating the catalyst, after storage, to a temperature between 500° F. to 1200° F. It will be seen that this is an important discovery in that it avoids the costly process of remolding the catalyst as might otherwise be necessary.

The following experiments illustrate the effectiveness of the method of the invention in restoring the compression strength of a catalyst which has been exposed to air:

Example 1

A catalyst comprising Activated Alumina and about 7% by weight of molybdenum oxide is prepared in the manner described above. The paste is extruded into pellets and these are dried and then activated by keeping in an electric muffle furnace maintained at 1200° F. for 2 hours. The compression strength of the activated pellets is 22 lbs. They are then kept in storage, exposed to air, for a period of 3 months at the end of which time the compression strength is only 14 lbs. The pellets are then reheated to a temperature between 1100° F. and 1200° F. for a period of 1 hour and the compression strength is then found to be 24 lbs.

Example 2

Pellets of an alumina-molybdenum oxide catalyst are prepared as in Example 1 and then activated by heating for 2 hours at 1100° F. The compression strength of the activated pellets is 16 pounds. They are exposed to air for 7 days at the end of which time the compression strength has fallen to 12 pounds. After reheating for 1 hour at a temperature between 1100° F. and 1200° F., the compression strength is found to be 19 pounds.

The invention is not limited by any theories of the mechanism of the treatment nor by any details which have been given merely for purposes of illustration, but is limited only in and by the following claims.

I claim:

1. The method of imparting high compression strength to a catalyst containing alumina and a compound of a metal of the VI group of the periodic system which comprises heating the catalyst after its original compression strength has been reduced by prolonged exposure to air during storage, to a temperature between 500° F. and 1200° F. for a time sufficient to increase substantially the reduced compression strength of the catalyst.

2. Method according to claim 1 in which the catalyst comprises alumina and from 1 to 20% by weight of molybdenum oxide.

3. Method according to claim 1 in which the catalyst is heated to said temperature between 500° F. and 1200° F. for a period of about 1 hour.

4. Method according to claim 1 in which the catalyst, after its original compression strength has been reduced by exposure to air, is heated to a temperature between 700° F. and 1000° F. for a period of about 1 hour.

5. The method of imparting high compression strength to a catalyst containing alumina and a compound of a metal of the VI group of the periodic system which comprises activating the catalyst and heating the activated catalyst after its original compression strength has been reduced by prolonged exposure to air during storage, to a temperature between 500° F. and 1200° F. for a time sufficient to increase substantially the reduced compression strength of the catalyst.

6. The method of imparting high compression strength to a catalyst containing alumina and a compound of a metal of the VI group of the periodic system which comprises forming the catalyst into small lumps, activating the thus-formed catalyst by the application of heat and heating the activated catalyst after its original compression strength has been reduced by prolonged exposure to air during storage, to a temperature between 500° F. and 1200° F. for a time sufficient to increase substantially the reduced compression strength of the catalyst.

WALTER G. SCHARMANN.